United States Patent
St. Rock et al.

(10) Patent No.: US 11,591,075 B2
(45) Date of Patent: Feb. 28, 2023

(54) INTELLIGENT ENGINE OFFLOAD OF AUXILIARY LOADS FOR ENHANCED ENGINE DURABILITY

(71) Applicant: Hamilton Sundstrand Corporation, Charlotte, NC (US)

(72) Inventors: Brian St. Rock, Andover, CT (US); Stephen E. Tongue, Hampden, MA (US); Matthew Robert Pearson, Hartford, CT (US); Juan de Bedout, Charlotte, NC (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 125 days.

(21) Appl. No.: 16/439,919

(22) Filed: Jun. 13, 2019

(65) Prior Publication Data
US 2020/0391850 A1    Dec. 17, 2020

(51) Int. Cl.
*B64C 19/00*    (2006.01)

(52) U.S. Cl.
CPC .................................. *B64C 19/00* (2013.01)

(58) Field of Classification Search
None
See application file for complete search history.

(56) References Cited

U.S. PATENT DOCUMENTS

| | | | |
|---|---|---|---|
| 5,791,982 A * | 8/1998 | Curry | B64D 13/00 454/74 |
| 8,209,101 B2 | 6/2012 | Breit | |
| 8,657,227 B1 * | 2/2014 | Bayliss | B64D 13/00 244/58 |
| 8,738,268 B2 * | 5/2014 | Karimi | H02J 3/38 701/99 |
| 8,820,677 B2 * | 9/2014 | Rajashekara | H02J 3/46 244/58 |
| 9,382,010 B2 | 7/2016 | Chen et al. | |
| 10,093,408 B1 * | 10/2018 | Smith | B64C 13/40 |
| 10,396,565 B2 * | 8/2019 | Bailey | B64D 47/00 |
| 10,689,129 B1 * | 6/2020 | Nehmeh | H02J 7/34 |
| 10,814,999 B2 * | 10/2020 | Elliott | H02J 3/14 |
| 2003/0075643 A1 * | 4/2003 | Dunn | B64D 27/24 244/59 |
| 2004/0057177 A1 * | 3/2004 | Glahn | H02J 3/14 361/62 |

(Continued)

OTHER PUBLICATIONS

Extended Eorpean Search Report for Application No. 19212740.5-1202; dated Feb. 10, 2020; 11 pages.

*Primary Examiner* — James J Lee
*Assistant Examiner* — Tawri M Matsushige
(74) *Attorney, Agent, or Firm* — Cantor Colburn LLP

(57) ABSTRACT

Provided are embodiments for a system for offloading non-thrust loads. The system includes one or more thrust loads, and one or more non-thrust loads, and a controller that is operably coupled to the one or more thrust loads and the one or more non-thrust loads. The controller is configured to control the thrust loads and non-thrust loads, receive input from one or more sources, and identify a phase of flight based at least in part on the received input. The controller is also configured to offload one or more non-thrust loads during the phase of flight, and restore the one or more non-thrust loads. Also provided are embodiments for method for offloading non-thrust loads.

18 Claims, 3 Drawing Sheets

(56) References Cited

U.S. PATENT DOCUMENTS

| | | | |
|---|---|---|---|
| 2009/0132106 A1 | 5/2009 | Dejonge | |
| 2009/0152942 A1* | 6/2009 | Waite | H02J 1/14 |
| | | | 307/9.1 |
| 2010/0204848 A1 | 8/2010 | Botura et al. | |
| 2013/0184901 A1* | 7/2013 | Wall | B60W 30/143 |
| | | | 701/3 |
| 2015/0151847 A1* | 6/2015 | Krug | B64D 15/04 |
| | | | 307/9.1 |
| 2016/0083106 A1* | 3/2016 | Lebrun | F01D 15/10 |
| | | | 322/8 |
| 2016/0090186 A1 | 3/2016 | Burns et al. | |
| 2016/0325826 A1 | 11/2016 | Swann | |
| 2017/0036773 A1* | 2/2017 | Jones | B64D 27/16 |
| 2018/0112599 A1* | 4/2018 | Dalal | F02C 7/268 |
| 2018/0273211 A1* | 9/2018 | Chang | B64D 41/00 |
| 2018/0327109 A1 | 11/2018 | Coat et al. | |
| 2018/0348794 A1* | 12/2018 | Berkley | B64C 27/68 |
| 2019/0079548 A1* | 3/2019 | Buffenbarger | B64D 41/00 |
| 2019/0106218 A1* | 4/2019 | Parkin | B64D 13/04 |
| 2019/0161196 A1* | 5/2019 | Heuer | B64D 13/06 |
| 2020/0025094 A1* | 1/2020 | Dalal | B64D 33/00 |

\* cited by examiner

INTELLIGENT ENGINE OFFLOAD OF AUXILIARY LOADS FOR ENHANCED ENGINE DURABILITY

BACKGROUND

The present disclosure relates to energy management, and more specifically to intelligent engine offload of auxiliary loads for enhanced engine durability of an aircraft.

Aircraft can generate electrical power from an electrical generator that is coupled to the aircraft's engine. Various configurations can be used to control the rotation of the electrical generator to produce the electrical power for the aircraft. The electrical energy requirements for the aircraft can depend directly or indirectly from the electrical power produced by the generator. Because energy is limited onboard the aircraft, there may be a need to optimize the energy usage onboard the aircraft.

BRIEF DESCRIPTION

According to an embodiment, a system for offloading non-thrust loads is provided. The system includes one or more thrust loads, one or more non-thrust loads, and a controller that is operably coupled to the one or more thrust loads and the one or more non-thrust loads. The controller is configured to control the thrust loads and non-thrust loads, receive input from one or more sources, and identify a phase of flight based at least in part on the received input. The controller is also configured to offload one or more non-thrust loads during the phase of flight, and restore the one or more non-thrust loads.

In addition to one or more of the features described herein, or as an alternative, further embodiments include a controller that is configured to at least one of reduce operation of the one or more non-thrust loads, completely turn off the one or more non-thrust loads, or supplement the one or more non-thrust loads with an auxiliary power source when offloading the one or more non-thrust loads.

In addition to one or more of the features described herein, or as an alternative, further embodiments include a controller that is configured to determine a pattern of usage of the one or more non-thrust loads over a period of time to minimize active one or more non-thrust loads during the identified phase of flight.

In addition to one or more of the features described herein, or as an alternative, further embodiments include a controller that is configured to manage interactions between the one or more non-thrust loads based at least in part on minimizing the active one or more non-thrust loads during the identified phase of flight, wherein managing the interactions comprises determining a time to activate the one or more non-thrust loads.

In addition to one or more of the features described herein, or as an alternative, further embodiments include an auxiliary power source that is at least one of a battery, an auxiliary power unit, or fuel cell.

In addition to one or more of the features described herein, or as an alternative, further embodiments include one or more non-thrust loads that are automatically restored after a configurable period of time or manually restored.

In addition to one or more of the features described herein, or as an alternative, further embodiments include one or more non-thrust loads that are automatically restored upon entering a different phase of flight.

In addition to one or more of the features described herein, or as an alternative, further embodiments include a controller that is configured to identify the phase of flight as a climb phase of flight that requires thrust.

According to an embodiment, a method for offloading non-thrust loads is provided. The method includes receiving input from one or more sources, and identifying a phase of flight based at least in part on the received input. The method also includes offloading one or more non-thrust loads during the phase of flight, and restoring the one or more non-thrust loads.

In addition to one or more of the features described herein, or as an alternative, further embodiments include offloading the one or more non-thrust loads includes at least one of reducing operation of the one or more non-thrust loads, completely turning off the one or more non-thrust loads, or supplementing the one or more non-thrust loads with an auxiliary power source during the phase of flight.

In addition to one or more of the features described herein, or as an alternative, further embodiments include determining a pattern of usage of the one or more non-thrust loads over a period of time to minimize active one or more non-thrust loads during the identified phase of flight.

In addition to one or more of the features described herein, or as an alternative, further embodiments include managing interactions between the one or more non-thrust loads based at least in part on minimizing the active one or more non-thrust loads during the identified phase of flight, wherein managing the interactions comprises determining a time to activate the one or more non-thrust loads.

In addition to one or more of the features described herein, or as an alternative, further embodiments include one or more non-thrust loads that are automatically restored after an expiry of a period of time.

In addition to one or more of the features described herein, or as an alternative, further embodiments include one or more non-thrust loads that are manually restored by an operator.

In addition to one or more of the features described herein, or as an alternative, further embodiments include non-thrust loads that are manually restored upon entering a different phase of flight.

In addition to one or more of the features described herein, or as an alternative, further embodiments include a phase of flight that is an initial climb phase of flight.

In addition to one or more of the features described herein, or as an alternative, further embodiments include an auxiliary power includes that is at least one of a battery, an auxiliary power unit, or fuel cell.

In addition to one or more of the features described herein, or as an alternative, further embodiments include one or more non-thrust loads that are offloaded during the entire phase of flight.

In addition to one or more of the features described herein, or as an alternative, further embodiments include one or more non-thrust loads that are offloaded during a portion of the phase of flight.

In addition to one or more of the features described herein, or as an alternative, further embodiments include offloading the one or more non-thrust loads based on exceeding a threshold level.

Technical effects of embodiments of the present disclosure include operating the aircraft in flex mode during take-off and climb phase of flight to increase the life of the engine by bringing the non-thrust energy loads into the energy management process. It is to be understood that the energy management process can be extended to other flight conditions.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Aircraft operate through a variety of phases during the normal course of a flight. The stress and loads experienced by the aircraft can vary with the phase of flight. For example, during the climb phase, a higher load is experienced by the turbine and generator than during a cruising phase of flight. Similarly, the taxi and descent phase of flight do not generally require high loads during operation.

The top-of-climb (TOC) phase can be the most difficult operating point for an aircraft, with high thrust rate to raise the aircraft to cruise altitude while at low air pressure, resulting in the highest engine combustor/turbine operating temperatures of any phase of flight. Other phases of flight such as takeoff, go-around, and emergency can also produce high temperatures in the engine combustor/turbine. The significant percentage of engine combustor/turbine degradation occurs in these flight phases due to the high temperatures that are present in the engine.

The techniques described herein allow non-thrust loads to be offloaded during or near the TOC phase of flight or other phases of flight to minimize engine wear and maximize the engine life.

Figure 1:
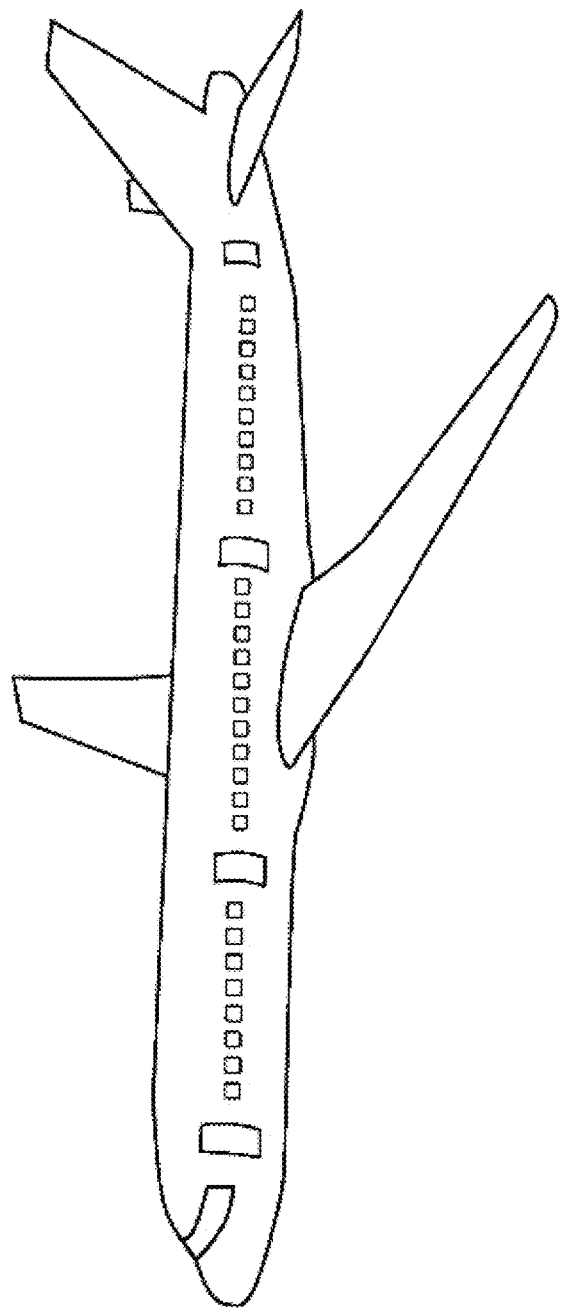
FIG. 1 depicts an example aircraft which operates in accordance with one or more embodiments.

Now referring to FIG. 1 an example aircraft which operates to offload non-thrust loads during a climbing phase of flight in accordance with one or more embodiments is shown. The aircraft 100 can include an aircraft management system that operates in accordance with the method 300 discussed below with reference to FIG. 3.

Figure 2:
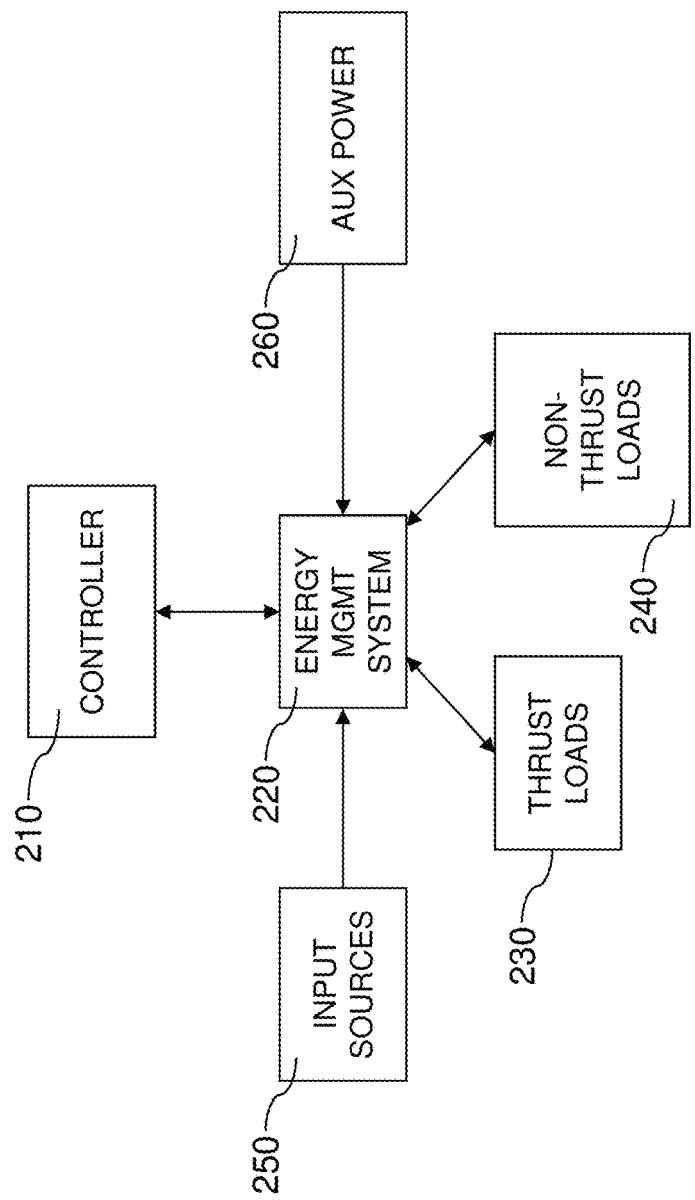
FIG. 2 depicts a system for practicing the techniques described herein.

Now referring to FIG. 2, a block diagram for an example system 200 that can be incorporated into an aircraft 100 in accordance with one or more embodiments is shown. The system 200 includes a controller 210 that can be electrically coupled to components of the aircraft over a wired or wireless connection. In this example, the controller 210 is coupled to an energy management system 220. In some embodiments, the controller 210 can be included as part of the energy management system 220. In other embodiments, the controller 210 can be directly coupled to the other components, systems, and subsystems of the aircraft 100. The energy management system 220 is coupled to thrust loads 230 and non-thrust loads 240. The thrust loads 230 can include equipment such as the turbine and generator which is used to generate thrust for the aircraft 100. The non-thrust system 240 can include loads that do not generate thrust for the aircraft 100 but can be used to provide other services to the aircraft passengers. For example, these loads can include non-essential electrical loads such as galley heating/cooling, environmental control system operation, fuel tank-inerting systems, refrigeration systems and ovens, customer charging ports and power outlets, and the like. These are examples of non-limiting non-thrust loads that can be offloaded during flight.

FIG. 2 depicts an aircraft energy management system 220 for performing the operation as described herein. The aircraft management system 220 receives input sources 250 from sensors, subsystems, etc. that can provide information to the energy management system 220 to determine when one or more non-essential non-thrust loads can be offloaded during a particular phase of flight. Sensors can be used to determine when to reduce the loads. For example, various sensors can be used to determine various temperature, pressure, and oxygen levels. Other sensors can be used to determine a particular phase of flight based on an altitude, engine thrust demand, flight management computer information, or other information. The non-thrust loads can be reduced by a configurable amount ranging from 0-100% based on the critical nature of the load. For example, some loads can be reduced by 5%, 10%, 30%, etc. as needed. In addition, the loads can be dynamically reduced after an initial reduction if needed.

In the event the energy management system 220 offloads one or more non-thrust loads during a phase of flight, in some embodiments, an auxiliary power source 260 can be used to supplement the non-thrust loads. For example, the auxiliary power source 260 can include a rechargeable type battery source that can be turned ON/OFF when the non-thrusts loads are offloaded.

In other embodiments, the non-thrust loads can be turned OFF for a configurable period of time. For example, systems that have a large energy capacitance, such as an aircraft fuselage which is a pressure vessel, can maintain a safe cabin pressure, temperature, and oxygen levels for several minutes and can be turned OFF for a period of time. In the event, the threshold levels for the fuselage are detected by sensors or other sources and are below the required levels, the energy management system can return to the ON state to re-pressurize the system.

In some embodiments, the non-thrust loads can be brought back online automatically after a configurable period of time or manually brought back online by a signal from an operator that is received from the controller 210 and provided to the energy management system 220. Similarly, the non-thrust loads 240 can be automatically brought back online for operation from the auxiliary power source 260 either automatically or manually. In other embodiments, machine-learning algorithms can be used over time to minimize the peak non-thrust energy load on the engine at a given phase of flight. This can allow each airline to equip the aircraft and customize the energy management system 220 for each airline customer. This can reduce the ability to individually program each controller for the different airlines and aircraft. Machine learning can avoid the complexity by adapting to how a given airline uses their aircraft.

In other embodiments, it should be understood that different priorities can be assigned by an operator or the energy management system 220 to establish a sequence in which non-thrust loads 240 can be offloaded and brought back online. The techniques described herein are not intended to limit the scope but to provide non-limiting examples of the operation of the system 200. In some embodiments, the energy management system 220 is configured to manage the interaction between the different loads. For example, consider 2 ovens that located in the galley that are required to be ON so that the first class customers can be served food quickly upon reaching the cruising altitude. Upon reaching a desired temperature, these ovens will cycle the heater ON/OFF to maintain the temperature. If the ovens are "dumb" then they will control their own cycle and lead to situations where both oven heating elements are ON at the same time, doubling the load momentarily. A smart energy management system 220 that is linked to these ovens can be used to manage the heating of the ovens. For example, the energy management system 220 can control the switching of the heating element ON/OFF in an alternating fashion, thus ensuring that only one oven is ON at a given time. In another example, if the fuel tank inerting system needs to be turned back ON, the fuel tank inerting system can be turned ON at a time when the environmental control system can stay OFF during that time. It should be understood that other this technique can be applied to other appliances and/or systems to coordinate and manage the offloading the non-thrust loads.

Figure 3:
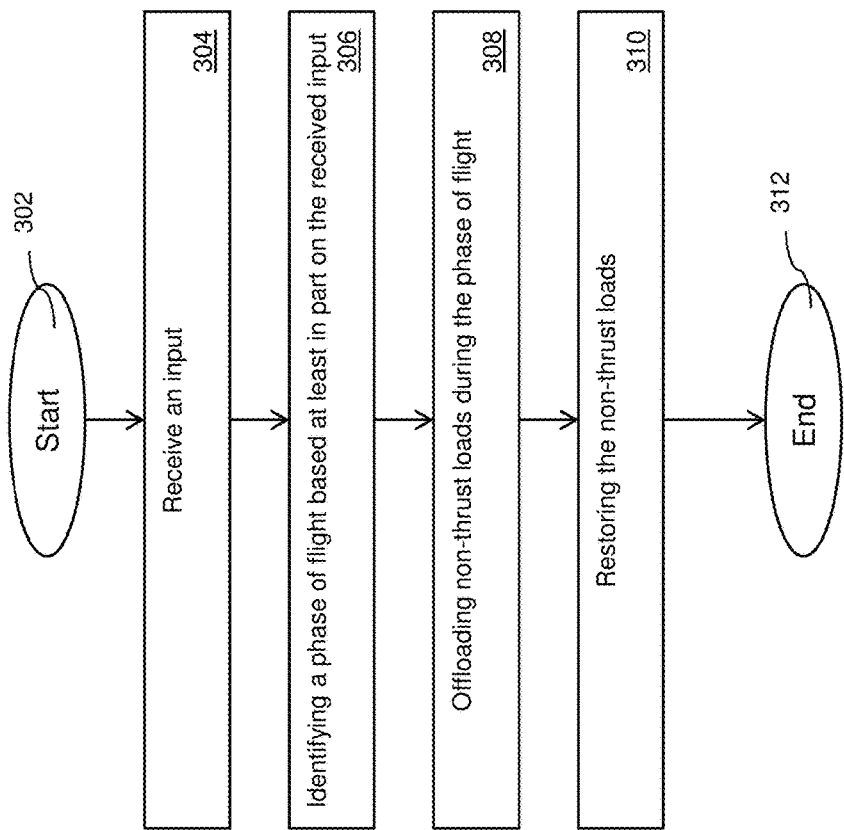
FIG. 3 depicts a flowchart for a method in accordance with one or more embodiments of the claims.

Now referring to FIG. 3, a flowchart of a method 300 for offloading non-thrust loads near TOC for an aircraft is shown. The method 300 begins at block 302 and continues to block 304 which provides for receiving input from one or more sources. In one or more embodiments, the sources can include systems, subsystems, sensors, or other inputs that are available to the controller 210.

Block 306 provides for identifying a phase of flight based at least in part on the received input. In one or more embodiments, the phase of flight can be determined by the aircraft controller or the data can be obtained from other sources. At block 308, the method 300 provides for offloading non-thrust loads during the phase of flight. The non-thrust loads can be offloaded by reducing the operation of the loads, shutting the loads OFF, or running the loads on an auxiliary power source. At block 310, the method 300 restores the non-thrust loads. The loads can be restored automatically or manually. The method 300 ends at block 312. It should be understood the energy management can be leveraged for other flight conditions and can be achieved using different steps or additional steps and is not limited by the example provided in FIG. 3.

The technical effects and benefits include minimizing engine wear and maximizing engine life of an aircraft. This can provide a reduction of loads placed on the engine can reduce the energy generation requirement by up to 5% or more. The reduction in load can provide hours of life to the engine due to reduced oxidation/corrosion in the system.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for offloading non-thrust loads, the system comprising:
   one or more thrust loads;
   one or more non-thrust loads;
   a controller that is operably coupled to the one or more thrust loads and the one or more non-thrust loads, the controller configured to control the thrust loads and non-thrust loads, wherein the controller is configured to:
   receive input from one or more sources;
   identify a phase of flight based at least in part on the received input;
   offload one or more non-thrust loads during the phase of flight, wherein the offloaded one or more non-thrust loads cycle between fully ON state and a second state where power is reduced by a configurable amount, wherein a duration in the second state of each non-thrust load in the one or more non-thrust loads is based on a load type for each non-thrust load; and
   restore the offloaded one or more non-thrust loads, wherein restoring the offloaded one or more non-thrust loads that were turned to the second state are turned to the fully ON state based at least in part on threshold levels for a fuselage detected by sensors.

2. The system of claim 1, wherein the controller is configured to determine a pattern of usage of the one or more non-thrust loads over a period of time to minimize active one or more non-thrust loads during the identified phase of flight.

3. The system of claim 2, wherein the controller is configured to manage interactions between the one or more non-thrust loads based at least in part on minimizing the active one or more non-thrust loads during the identified phase of flight, wherein managing the interactions comprises determining a time to activate the one or more non-thrust loads.

4. The system of claim 3, wherein an auxiliary power source is at least one of a battery, an auxiliary power unit or fuel cell.

5. The system of claim 1, wherein the one or more non-thrust loads are automatically restored after a configurable period of time or manually restored.

6. The system of claim 1, wherein the one or more non-thrust loads are automatically restored upon entering a different phase of flight.

7. The system of claim 1, wherein the controller is configured to identify the phase of flight as a climb phase of flight that requires thrust.

8. A computer-implemented method for offloading non-thrust loads, the computer-implemented method comprising:
receiving input from one or more sources;
identifying a phase of flight based at least in part on the received input;
offloading one or more non-thrust loads during the phase of flight, wherein the offloaded one or more non-thrust loads cycle between fully ON state and a second state power is reduced by a configurable amount, wherein a duration in the second state of each non-thrust load in the one or more non-thrust loads is based on a load type for each non-thrust load; and
restoring the offloaded one or more non-thrust loads, wherein restoring the offloaded one or more non-thrust loads that were turned to the second state are turned to the fully ON state based at least in part on threshold levels for a fuselage detected by sensors.

9. The computer-implemented method of claim 8, further comprising determining a pattern of usage of the one or more non-thrust loads over a period of time to minimize active one or more non-thrust loads during the identified phase of flight.

10. The computer-implemented method of claim 9, further comprising managing interactions between the one or more non-thrust loads based at least in part on minimizing the active one or more non-thrust loads during the identified phase of flight, wherein managing the interactions comprises determining a time to activate the one or more non-thrust loads.

11. The computer-implemented method of claim 8, wherein the one or more non-thrust loads are automatically restored after an expiry of a period of time.

12. The computer-implemented method of claim 8, wherein the one or more non-thrust loads are manually restored by an operator.

13. The computer-implemented method of claim 8, wherein the non-thrust loads are manually restored upon entering a different phase of flight.

14. The computer-implemented method of claim 8, wherein the phase of flight is an initial climb phase of flight.

15. The computer-implemented method of claim 14, wherein an auxiliary power source includes at least one of a battery, an auxiliary power unit, or fuel cell.

16. The computer-implemented method of claim 8, wherein the one or more non-thrust loads are offloaded during the entire phase of flight.

17. The computer-implemented method of claim 8, wherein the one or more non-thrust loads are offloaded during a portion of the phase of flight.

18. The computer-implemented method of claim 8, wherein offloading the one or more non-thrust loads is based on exceeding a threshold level.

* * * * *